US006959337B2

(12) United States Patent
McLaughlin et al.

(10) Patent No.: US 6,959,337 B2
(45) Date of Patent: Oct. 25, 2005

(54) NETWORKED SYSTEM FOR ASSURING SYNCHRONOUS ACCESS TO CRITICAL FACILITIES

(75) Inventors: Richard J. McLaughlin, Pleasanton, CA (US); Cynthia Sakaguchi, San Jose, CA (US); Farangis Aberg, Cupertino, CA (US); Marcelo M. de Azevedo, Round Rock, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 805 days.

(21) Appl. No.: 10/071,579

(22) Filed: Feb. 8, 2002

(65) Prior Publication Data

US 2002/0165929 A1 Nov. 7, 2002

Related U.S. Application Data

(60) Provisional application No. 60/286,053, filed on Apr. 23, 2001.

(51) Int. Cl.[7] .............................................. G06F 15/16
(52) U.S. Cl. ..................... 709/229; 709/203; 709/226; 710/200; 707/8
(58) Field of Search ................................. 709/201–203, 709/226–229; 707/8–10; 710/200

(56) References Cited

U.S. PATENT DOCUMENTS

| | | | | |
|---|---|---|---|---|
| 5,117,352 | A | * | 5/1992 | Falek .............................. 714/4 |
| 5,537,645 | A | * | 7/1996 | Henson et al. ............... 709/203 |
| 5,574,849 | A | | 11/1996 | Sonnier et al. ................ 714/12 |
| 5,630,136 | A | * | 5/1997 | Davidson et al. ........... 718/106 |
| 5,734,909 | A | * | 3/1998 | Bennett ....................... 710/200 |
| 5,751,932 | A | | 5/1998 | Horst et al. .................... 714/12 |
| 6,215,703 | B1 | * | 4/2001 | Bogin et al. ........... 365/185.33 |
| 6,516,351 | B2 | * | 2/2003 | Borr ........................... 709/229 |
| 6,772,162 | B2 | * | 8/2004 | Waldo et al. ................. 707/10 |

* cited by examiner

*Primary Examiner*—Saleh Najjar
*Assistant Examiner*—V. Korobov

(57) ABSTRACT

Maintenance of a network resource is regulated by providing a lock data area that indicates an ownership status of the network resource, and a lock server process to maintain the lock data area. A client that is to perform maintenance on the network resource sends a command to the lock server process to modify the lock data area to indicate ownership of the network resource by the particular client. In response, the lock server process sends a response indicating whether or not ownership of the network resource by the client has been established. If ownership is indicated, the client performs the maintenance on the network resource. If ownership is not indicated, the maintenance is not performed. Provision is made for retries, and also for forcing the lock if a current owner becomes moribund.

16 Claims, 8 Drawing Sheets

NETWORKED SYSTEM FOR ASSURING SYNCHRONOUS ACCESS TO CRITICAL FACILITIES

CROSS-REFERENCE TO RELATED APPLICATION

This application claims the benefit of and priority to prior U.S. Provisional Application, entitled "METHOD AND PROTOCOL TO ASSURE SYNCHRONOUS ACCESS TO CRITICAL FACILITIES IN A MULTI-SYSTEM CLUSTER," filed on Apr. 23, 2001, Ser. No. 60/286,053, which application is hereby incorporated by reference into the present application.

This application is related to U.S. Application entitled "A CLUSTERED COMPUTER SYSTEM AND A METHOD OF FORMING AND CONTROLING THE CLUSTERED COMPUTER SYSTEM," filed on Aug. 22, 2001, Ser. No. 09/935,440, which application is hereby incorporated by reference into the present application.

This application is related to U.S. Application entitled "METHOD AND APPARATUS FOR DISCOVERING COMPUTER SYSTEMS IN A DISTRIBUTED MULTI-SYSTEM CLUSTER," filed on Aug. 31, 2001, Ser. No. 09/945,083, which application is hereby incorporated by reference into the present application.

This application is related to U.S. Application entitled "METHOD AND APPARATUS FOR DETECTING AND REPORTING CONFIGURATION ERRORS IN A MULTI-COMPONENT SWITCHING FABRIC," filed on Dec. 21, 2001, Ser. No. 10/029,590, which application is hereby incorporated by reference into the present application.

FIELD OF THE INVENTION

The invention generally relates to the online maintenance of network resources. Also, the invention generally relates to the coordinated allocation, retention and release of control of a network resource by each one of a plurality of network management processes. More particularly, but not exclusively, the invention relates to the allocation, retention, and release of control of a programmable switch in a switched network to allow maintenance to be performed thereon.

BACKGROUND OF THE INVENTION

When continuous availability of a network resource is a desired goal, there are two main requirements:
1. It should be possible to maintain the resource's firmware and configuration files online with no, or minimal, disruption.
2. The ability to maintain the resource's firmware and configurations should be distributed among a number of the nodes of the cluster or network. This reduces the possibility of losing maintenance capability due to the loss of any single node or combination of nodes.

For a programmable switch, the switch firmware can receive, process, and reply to commands that allow network management clients running in the nodes to perform necessary maintenance operations. Because these commands can be accepted at any time by the switch, they satisfy the first requirement. Because the switch will accept these commands from a client running on any node, they satisfy the second requirement.

However, this introduces a new problem. Simultaneous (or near simultaneous) maintenance requests from multiple nodes, made to the same switch, will probably result in the mutual destruction of all such requests, and may result in the switch becoming completely inoperable.

Accordingly, it would be desirable to have a mechanism that addresses this and related problems.

SUMMARY OF THE INVENTION

According to one aspect of the invention, a mechanism is provided that allows for synchronization of online maintenance of the firmware and configuration files in the programmable switch components of a network. At the same time, the ability to direct that maintenance remains distributed among the nodes of the network.

A preferred embodiment of the invention provides for the maintenance of a computing environment comprised of a number of systems (also known as nodes or servers) connected in a cluster configuration by way of one or more external networks (also called external fabrics).

In the preferred embodiment, the maintenance is performed on the programmable switches by one or more of the servers. It will however be appreciated that the invention is not limited to such an application, but that network resources other than servers could perform the maintenance on other network resources than programmable switches. Also, the invention may be implemented on different network types having different (i.e. non-cluster) configurations.

According to another aspect of the invention, a networked computing system is provided that comprises:
  a) at least one network resource that is to be maintained;
  b) a lock data area indicating an ownership status of the network resource;
  c) a lock server process for maintaining the lock data area;
  d) a plurality of clients that are to perform maintenance on the network resource, each client being operative to:
    i) send a command to the lock server process to modify the lock data area to indicate ownership of the network resource by the client;
    ii) receive a response from the lock server process indicating whether or not ownership of the network resource by the client is indicated by the lock data area;
    iii) perform maintenance on the network resource only if ownership of the network resource is indicated by the lock data area.

If the response indicates that ownership of the network resource by the client is not indicated by the lock data area, the client may be operative to:
  i) set a retry interval timer; and
  ii) upon expiry of the retry interval timer, send a further command to the lock server process to modify the lock data area to indicate ownership of the network resource by the client.

After at least two unsuccessful attempts to modify the lock data area to indicate ownership of the network resource by the client, the client may be operative to:
  i) determine, from lock owner viability data received from the lock server process, whether or not a current lock owner is viable; and
  ii) if the current lock owner is not viable, send a command that is configured to establish the client as the lock owner notwithstanding that the client is not the current lock owner.

According to a further aspect of the invention, the command includes client viability data, the client being operative to, upon successfully modifying the lock data area to indicate ownership of the network resource by the client:

i) set a reacquire interval timer; and ii) send updated client viability data to the lock server process if maintenance being performed by the client has not been completed when the reacquire interval timer expires.

Still further, each of the plurality of clients has a unique and non-null lock owner ID, and the lock data area may include lock owner data, lock viability data, and retain interval data, and the command to the lock server process to modify the lock data area may include a set value, a test value, a viability value, and a retain interval value.

In one embodiment, the lock data area contains null data values when the network resource is not owned by any client.

Also, the lock server process may be operative to:

i) compare the test value in the command with a lock owner value in the lock data area; and ii) write the set value into the lock owner value if said comparison shows that the test value is equal to the lock owner value.

According to a further aspect of the invention, the client constructs the command with a set value equal to the client's lock owner ID and a null test value, unless the client has determined that the current lock owner is no longer viable.

Still further, the client may be operative to force the lock data area to indicate ownership of the network resource, the network resource nominally being owned by a second client, by sending a command that includes a test value equal to an identity of the second client and a set value equal to an identity of the forcing client.

According to another aspect of the invention, the step of determining lock owner viability performed by the client may comprise:

comparing lock owner data and lock viability data received in two consecutive responses from the lock server process. In such a case, the client may be operative to consider the current lock owner viable if the lock owner data or lock viability data received in two consecutive responses from the lock server process differ, and to otherwise consider the current lock owner non-viable.

According to another aspect of the invention, provided is a client process for maintaining a network resource, authorization to maintain the network resource being indicated by the contents of a lock data area stored on the network resource, the client process being configured to:

i) send a first request to modify the lock data area to indicate that the client process is authorized to maintain the resource;

ii) receive a first response indicating whether or not the client process has successfully modified the lock data area to indicate that the client process is authorized to maintain the network resource; and iii) send maintenance commands to the network resource only if the first response indicates successful modification of the lock data area.

In one embodiment, the client process is further configured to:

i) set a first retry interval timer if the first response indicates that the client process has not successfully modified the lock data area to indicate that the client process is authorized to maintain the network resource;

ii) after the first retry interval timer expires, send a second request to modify the lock data area to indicate that the client process is authorized to maintain the network resource;

iii) receive a second response indicating whether or not the client process has successfully modified the lock data area to indicate that the client process is authorized to maintain the network resource; and iv) send maintenance commands to the network resource only if the second response indicates successful modification of the lock data area.

According to a further aspect of the invention, the first response includes first viability data and the second response includes second viability data, the client process being configured to:

i) compare the first viability data with the second viability data;

ii) based on the comparison, either set a second retry interval timer or send a third request to modify the lock data area, the third request being configured to ensure that the lock data area will be modified to indicate that the client process is authorized to maintain the network resource;

iii) receive a third response indicating whether or not the client process has successfully modified the lock data area to indicate that the client process is authorized to maintain the network resource; and iv) send maintenance commands to the network resource only if the third response indicates successful modification of the lock data area.

Still further, the client process may be operative to:

set a reacquire interval timer if the client process receives a response indicating successful modification of the lock data area to indicate that the client process is authorized to maintain the network resource;

provide viability data to be stored in the lock data area;

on every expiry of the reacquire interval timer, restart the reacquire interval timer and send a request to modify the lock data area with new viability data to indicate that the client process continues to viably hold the network resource, and upon completion of the maintenance commands by the network resource, cancel the reacquire interval timer and send a new request to modify the lock data area with null values to indicate that the network resource is no longer owned by any client process.

Also, the client process may further be operative to:

abort the intended transmission of maintenance commands to the network resource with an appropriate error indication if the first, second, and third responses indicate that the client process has not successfully modified the lock data area to indicate that the client process is authorized to maintain the network resource.

Preferably, the duration of the retry interval timer is at least twice the duration of retain interval data returned in a response sent by the lock server process.

According to yet another aspect of the invention, provided is a lock server process for use in regulating maintenance activities performed on a network resource, comprising:

i) a lock data area for indicating an ownership status of the network resource, the lock data area including lock owner data; and ii) a lock server routine, the lock server routine being operative to receive an instruction to modify the lock owner data, the instruction including a set value and a test value, the lock server routine being operative to:

iii) compare the test value against the lock owner data; and iv) replace the lock owner data with the set value if the test value is the same as the lock owner data.

The lock data area may further include viability data and the instruction may further include a viability value, the lock server routine in use being operative to replace the viability data in the lock data area with the viability value in the instruction if the test value is the same as the lock owner data.

The lock data area may further include retain interval data and the instruction may further include a retain interval value, the lock server routine in use being operative to replace the retain interval data in the lock data area with the retain interval value in the instruction if the test value is the same as the lock owner data.

The lock server routine may further be operative to respond to the instruction with the lock owner data, the viability data and the retain interval data after conducting any updates in the lock data area.

The lock server routine may further be operative to modify the lock data area with null values to indicate that the network resource is not owned by any client process, whenever the network resource is powered on or is reset via an operator command.

The lock data area may further be organized as a plurality of locks for control of concurrent maintenance operations performed on the network resource.

Further aspects of the invention will be apparent from the Detailed Description of the Invention.

DETAILED DESCRIPTION OF THE INVENTION

Figure 1:
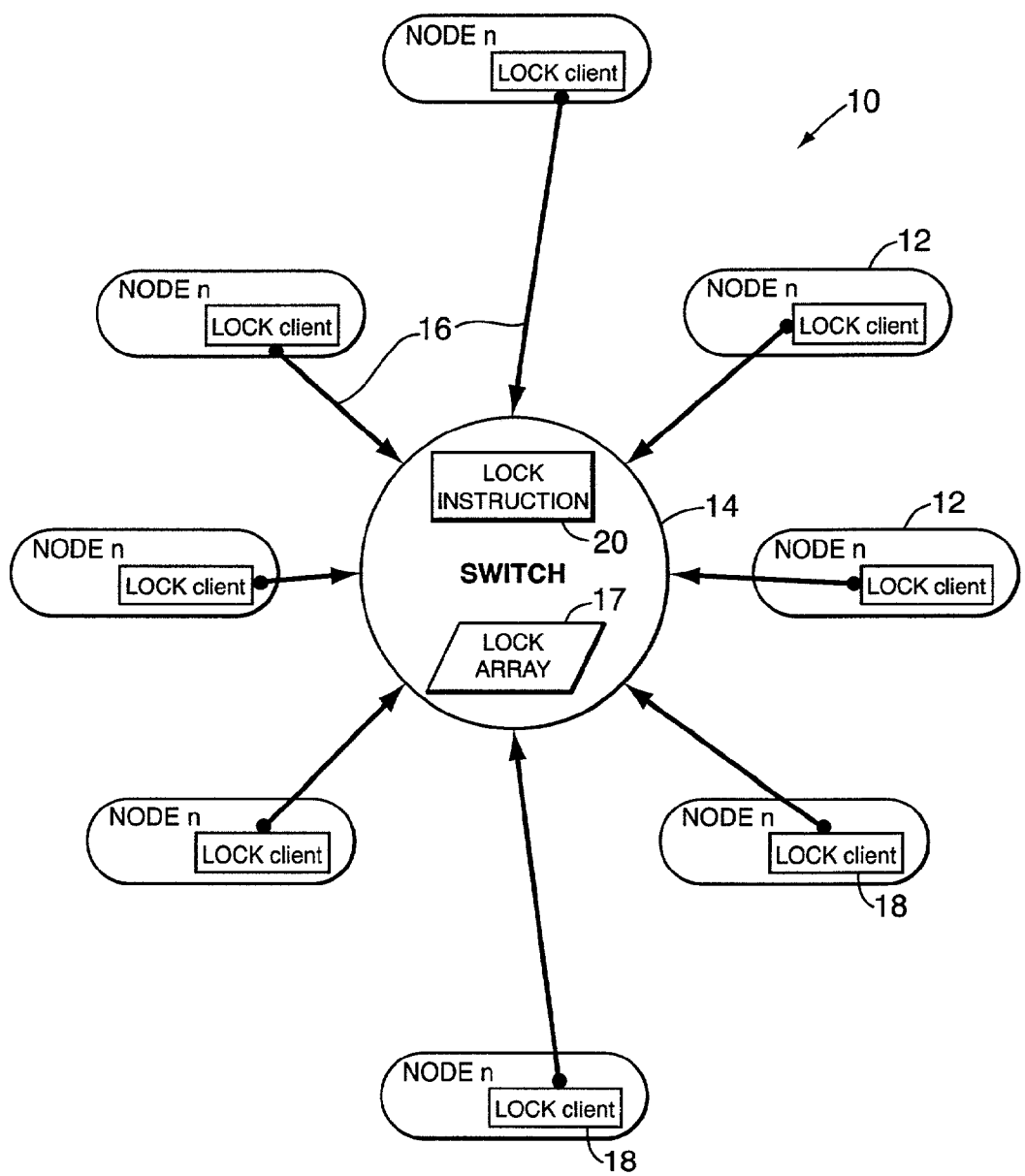
FIG. 1 is a schematic diagram of a network system according to an embodiment of the invention.

FIG. 1 shows a network cluster 10 in which the invention is implemented. The network cluster 10 includes a plurality of nodes 12 in a cluster configuration. The nodes 12 are interconnected by an external high-speed switching fabric comprising one or more programmable switches 14 and a number of network links 16. Each node 12 is typically a server having one or more processor units interconnected by one or more internal high-speed fabrics (not shown). The internal high-speed switching fabric within each node 12 has the function of routing packets from a source processor unit or I/O device to a destination processor unit or I/O device within that same node 12. Optionally, two internal high-speed switching fabrics, for fault tolerance, interconnect the processor units and I/O devices.

The external high-speed switching fabric provides connectivity between nodes 12 in the cluster by routing packets between processor units (and possibly I/O devices) in different nodes 12. Each node 12 in the cluster has a unique node number, depending on its location in the cluster topology. In some configurations, two external fabrics, for fault tolerance, interconnect the nodes 12 of the cluster.

In the illustrated embodiment, the network cluster 10 is a Compaq™ NonStop™ ServerNet™ Cluster, the nodes 12 are Compaq™ Himalaya S-Series™ servers (see U.S. Pat. No. 5,751,932 incorporated herein by reference), the switch 14 is a Compaq™ NonStop™ Himalaya™ Cluster Switch, and the switch fabric is a Compaq™ ServerNet™ System Area Network (SAN).

Management processes (e.g. the lock client process 18 in FIG. 1) running on the nodes 12 use a communication protocol to exchange management information with one or more switches 14. Management information is exchanged via the ServerNet™ System Area Network, as opposed to via separate management channels. Because the management protocol shares network bandwidth (although a very small portion thereof) with inter-nodal data traffic, the management protocol is referred to as In-Band Control (IBC). The IBC protocol is used for communication of initialization, configuration, topology, operations, service, and maintenance information across ServerNet™, regardless of the configuration of the network.

In the illustrated embodiment, the lock client processes 18 that provide network maintenance are Compaq™ System Area Network Manager (SANMAN) processes. Typically, each node 12 runs one instance of the SANMAN process. Note, it is possible for a node 12 to be fully operational without a SANMAN process running in it, but such a node can not participate in the control or management of switches 14.

Note however that the invention is not limited to the particular configuration described above. In particular, different equipment, configurations, network types, internetworks, protocols, interconnects etc. are all permissible and contemplated as being within the spirit and scope of the invention.

While it is preferable that all of the nodes 12 in the cluster are of the same type, this is also not essential to the present invention. The present invention is operative in heterogeneous environments as long as the participating nodes 12 provide the required elements and logic to cooperatively implement the invention. Also, the present invention is applicable to nodes 12 having a single processor unit. Furthermore, the invention is operative in a variety of different types of network architectures, such as ServerNet™ (from Compaq™ Computer Corporation), or the switched fabric architecture proposed by the Infiniband™ Trade Association. U.S. Pat. No. 5,751,932, issued to Horst, et al., discusses the ServerNet™ architecture and is hereby incorporated by reference into the present application.

An external fabric usually includes a plurality of interconnected switches 14, depending on the number of nodes 12 and capabilities of the switch 14. For example, if each switch 14 has twelve ports numbered from 0 through 11, with ports 0–7 being reserved for connectivity to nodes 12 and ports 8–11 being reserved for connectivity to one or more other switches 14, then an external fabric comprised of a single switch 14 (as shown in FIG. 1) can connect up to eight nodes 12 in a cluster. If the desired number of clustered nodes 12 is more than eight, then more than one switch 14 per external fabric is needed. Other requirements, such as bandwidth and allowance for future expansion of a cluster, may dictate that two or more switches 14 be used in the external fabric.

Each switch 14 includes routing hardware for routing packets from any of the plurality of switch ports to any other of the plurality of switch ports. Each switch 14 also includes a first memory having a firmware program resident therein that includes routines that are operative to receive, process, and respond to switch management packets sent by nodes 12 or other switches 14, as well as a processor connected to the memory, for executing programs resident in the first memory. The firmware also includes a routine (referred to herein as a lock server) for maintaining the lock data and for receiving and responding to lock instructions transmitted by lock client processes 18. The switch 14 also includes a second memory having a configuration file resident therein, the configuration file including a routing table that specifies how packets are to be routed between the plurality of ports, and an internal port configured to transfer switch management packets to and from any of the other switch ports.

In a fault-tolerant implementation, the switch's first memory is typically organized into two separate non-volatile memory banks, with each bank containing one copy of the firmware program. In the event of a failure of one of the firmware memory banks, the switch 14 can run a backup copy of the firmware program stored in the other firmware memory bank. Similarly, in a fault-tolerant implementation, the switch's second memory is typically organized into two separate non-volatile memory banks, with each bank containing one copy of the switch configuration file.

In one embodiment of the invention, an instance of a System Area Network MANagement (SANMAN) process (i.e. the lock client process 18 in FIG. 1) runs in each node 12. The SANMAN process provides management services to the external fabric switches 14. Typically, a management console (not shown) is available at each node 12. An operator, from a management console at any node 12, can issue commands to manage the external fabric switches 14. Examples of management actions on a switch 14 include, but are not limited to, downloading a new version of the firmware program to a switch 14, downloading a configuration file with the correct routing table for the particular position occupied by a switch 14 on the external fabric, resetting a switch 14 to force it to start running a newly downloaded firmware or configuration file, and querying a switch 14 for the current status of its hardware and firmware.

Some management actions are "sensitive" actions. As the name implies, sensitive actions are those that cause a change in the status of the switch, or which may cause problems if they are not executed properly or completely.

In one embodiment, the SANMAN processes (i.e. the lock client processes 18 in FIG. 1) embed full software implementations of various switch management services. Such implementations are referred to as packaged management services, and provide an abstraction in which the details of the individual commands sent by a SANMAN process to a switch 14 are fully contained within the SANMAN software, and are therefore hidden from an external human interface software layer. Typical examples of packaged management services include, but are not limited to, downloading a firmware program to a switch 14, downloading a configuration file to a switch 14, resetting a switch 14, and querying a switch 14 for the current status of its hardware and firmware. For such packaged management services, the SANMAN process is responsible for implicitly issuing a "take ownership" command to the switch 14 for any management services entailing sensitive commands. In the examples mentioned, the SANMAN process would implicitly issue a "take ownership" command as the first command of a firmware download, configuration download, or switch reset sensitive command sequence. However, a "take ownership" command is not necessary for a switch status query, because querying the status of a switch 14 is not a sensitive operation.

The human interface software layer may be implemented as a Graphical User Interface (GUI) on a management console connected to each node 12, or as a command-line interface. The command-line interface can be accessed via a logon screen to one of the nodes 12. Typically, both embodiments of the human interface software layer are provided for maximum flexibility and convenience to operators. Sensitive management actions on switches 14 are typically limited to operators with a super-user logon and password, and are not available to standard users of the nodes 12.

An advantage of packaging management services within the SANMAN process is that it simplifies the implementation of external human interface software layers. For example, for a firmware download action the human interface software layer needs only to issue a request to the SANMAN process specifying the name and location of a firmware file, and the position ID and fabric ID of the switch 14 that is to receive the firmware file. The SANMAN process will be responsible for opening the file, verifying that the file contains a valid switch firmware image, issuing a "take ownership" command to the switch 14, and subsequently downloading the file to the switch 14 via a series of sensitive commands sent to the switch 14. Subsequently, SANMAN notifies the external human interface software layer of the successful or failed completion of the firmware download. Other packaged management services are implemented similarly.

An alternative to "SANMAN-packaged" management services is to move a substantial portion of these services to the human interface software layer. In this implementation, the SANMAN process merely provides an open "pass-through" transport interface to send commands to and receive command responses from a switch 14. The human interface software layer is responsible for generating the necessary sequence of commands for each particular type of management service, including a "take ownership" command if the command sequence is sensitive. After formatting the necessary sequence of commands, the human interface software layer requests that SANMAN send the commands to a particular switch 14. In a simple implementation of this "pass-through" interface, SANMAN sends the commands to the switch 14 without checking the type of management action conveyed in the commands (i.e., the external human interface software is trusted by SANMAN). SANMAN stores any responses received back from the switch 14, and after completing the transmission of the command sequence (or upon encountering an error when sending the commands), SANMAN returns any received responses to the human interface software layer.

Implementing packaged management services on the human interface software is often disadvantageous when the services are to be provided via multiple types of human interface (e.g., a GUI and a command-line human interface). This causes duplication of software, including software that may run on different platforms and operating systems. For example, GUI human interface software typically runs on a management console connected to each node 12, whereas command-line human interface software runs on the nodes 12 themselves. Duplicated software implementations under these conditions tend to be more costly, often involving different software development and sustaining teams, and different software development tools such as compilers. For these reasons, packaging management services in the SANMAN process is preferred for all services that are to be provided via multiple types of human interface.

Despite the advantages mentioned above for "SANMAN-packaged" management services, an open "pass-through" transport interface to send commands to and receive command responses from a switch 14 is also desirable. An open "pass-through" interface facilitates implementing specialized management services such as diagnostic and troubleshooting actions on switches 14. Diagnostic or fault incident analysis services are often complex and are better implemented as a separate software layer, typically with a single type of human interface (often a GUI interface) to guide the operator through a series of troubleshooting steps. Diagnostic actions on switches 14 are typically sensitive, and may entail, for example, placing one or more switch ports in loop back mode. This action allows testing a particular port by having the switch 14 send diagnostic packets to itself via the port under test. Fault-tolerant implementations of switches 14 often also require several additional types of diagnostic services. For example, a fault-tolerant switch 14 equipped with redundant power supplies and battery backup requires periodic load tests on the backup power supply and the batteries. These tests ensure that these components are functional and ready to take over an active role in providing power to the switch 14, in the event of a failure of the primary power supply or loss of AC power on both the primary and backup power supplies.

A diagnostic software layer implemented separately from the SANMAN process can utilize the open SANMAN "pass-through" or "raw" transport interface described above to send commands to and receive command responses from a switch 14. In this embodiment, the complexity of the diagnostic management services can be fully contained within a separate diagnostic software layer. Good software engineering practices often require such functional separation. In such a case, a separate diagnostic software layer avoids an overly complex software implementation of the SANMAN process.

Because most diagnostic services are sensitive, the diagnostic software layer is responsible for preceding a sequence of diagnostic commands with a "take ownership" command. The complete command sequence is subsequently presented to the SANMAN "pass-through" transport interface. SANMAN sends the commands to the switch 14 and stores any command responses received back from the switch 14. After completing the transmission of the command sequence (or upon encountering an error when sending the commands), SANMAN returns any received command responses to the diagnostic software layer.

To summarize the discussion above, a typical implementation of switch management services includes a "take ownership" command that precedes a sensitive command sequence sent to a switch 14. The sensitive command sequence may be formed as follows:

1. Sensitive command sequences formed within the SANMAN process—In this case, the SANMAN process is responsible for forming the sensitive command sequence, and preceding the sequence with a "take ownership" command. Sensitive command sequences for "SANMAN-packaged" management services such as firmware download, configuration download, and switch reset are formed in this fashion.

2. Sensitive command sequences formed outside of the SANMAN process—In this case, an external software layer is responsible for forming the sensitive command sequence, and preceding the sequence with a "take ownership" command. One example of a sensitive command sequence formed in this fashion is a switch diagnostic command sequence formed by a separate diagnostic software layer.

As depicted in FIG. 1, a switch 14 can be managed by a plurality of fabric management processes (lock client processes 18). The management role among the fabric management processes is distributed and egalitarian, without any of the processes assuming a specialized or mastership function. This distributed management model offers a number of advantages. First, it avoids the additional complexity of an election algorithm to select a master fabric management process—such an algorithm would have to include a mechanism to detect failures of the master fabric management process and elect a new master in the event of such failures. Second, it gives the operator the ability to manage the external fabrics from any of the nodes 12. This provision ensures more than just convenience to the operator. In fact, it may prove critical for availability of the entire cluster by ensuring that problems are promptly reported at all participating nodes 12, and service actions and repairs can be initiated from any node 12 without potential delays or difficulties associated with logging on to a particular node 12. Third, it ensures that the fabric management functionality is fault-tolerant. Namely, fabric management is still possible from other nodes 12 despite the failure of any specific fabric management process or perhaps even the failure of an entire node 12. Fourth, it ensures that the external fabric can still be managed despite certain failures that can impair a particular fabric management process from performing its role. For example, if a link 16 connecting a node 12 to a switch 14 fails, fabric management functions can still be performed from other nodes 12. Note however that use of the invention in a system in which one of the management processes assumes a specialized or mastership function is not precluded, it is just not preferred.

Despite possessing several desirable advantages, a distributed management model allows sensitive commands to the same switch 14 to be initiated concurrently from different nodes 12.

In the illustrated embodiment, a switch 14 will not accept sensitive commands from a node 12 unless the node 12 previously took control of said switch 14 via a "take ownership" command. Sensitive commands received from a node 12 that does not currently control the switch 14 are rejected and replied to with negative acknowledgement (NACK) responses sent by the switch 14.

The ability of a node 12 to take control of a switch 14 is not, in and of itself, a sensitive command (it causes no change in the switch's status); and there is no required pre-existing state of control when any specific node 12 in the cluster requests control for itself. Therefore, in the absence of further safeguards, the following scenario is possible:

1. Node A issues a "take ownership" command to switch X.
2. Control is granted to Node A.
3. Node A begins a sensitive multi-command sequence to update a configuration file in switch X.
4. Node A successfully issues and completes some (but not all) of the commands in the update sequence.
5. Node B issues a "take ownership" command to switch X.
6. Control is taken away from Node A and given to Node B.
7. Node A issues the next command in the update sequence.

8. This command fails with a NACK response because it is a sensitive command and Node A does not control the switch.
9. Node B runs its maintenance function, which may, or may not, duplicate what Node A was attempting to do.

This leaves several problems for an operator at Node A:

1. The operator is notified that the update failed because of a control problem, but the operator must make special provisions to determine what node 12 now has control.
2. The operator is not able to determine whether the other node 12 duplicated the operation it was attempting, or ran some completely different sensitive operation. In fact, it is possible that the other node 12 ran no operation at all, but merely took control and then did nothing.
3. Unless the other node 12 was, in fact, performing a configuration file update, one of the switch configuration file storage banks is left in a corrupted state due to an unfinished configuration download command sequence initiated by Node A but interrupted by Node B. At this juncture, unless the condition is corrected by a successful retry of the configuration download command sequence, the switch 14 will be running in a non-fault tolerant mode. That is, given that one of the switch configuration file storage banks is corrupted, a memory part failure that impairs the other configuration file storage bank cannot be tolerated and will render the switch 14 inoperable if it occurs.

One method of addressing such problems is human intervention, but it is usually post-event and reactive. Such a method can take any one of the following three forms:

1. Proactive—Before requesting a sensitive operation, the operator at a node 12 would communicate with the operators at all other nodes 12 and agree on whose turn it was to do maintenance, and what was to be done.
2. Reactive (uncoordinated)—When a requested function fails, the operator at the requesting node 12 is notified and arbitrarily retries the request.
3. Reactive (coordinated)—When a requested function fails and the operator at the requesting node 12 is notified, the operator communicates with the operators at all other nodes 12 to determine:
   which one caused the original request to fail,
   what the second request was attempting, and
   what sequence of operations and requests is now required to correctly complete the desired management actions on the switch 14.

The operator is then required to restart the sensitive operations in the sequence determined by the above steps.

The first form, favored over the other forms, has an impact primarily on human availability. It involves a planning effort and implementation coordination.

By comparison, the second form probably works most of the time. The speed of a system node 12, relative to that of a human operator, is usually sufficient to allow the second sensitive operation to complete before the first node's operator can observe the failure message and restart the original request. However, this is not guaranteed. A request restarted by the first node 12 may actually steal switch ownership back from the second node 12, thus causing the second node's request to fail, and potentially initiating a "vicious cycle" of failures.

The third form, although expected to always work, has the disadvantage of delaying the maintenance of the switch 14, and therefore, possibly the availability of cluster applications. This is particularly true in large clusters with nodes 12 spaced over distances of one kilometer or more, in which operators at different geographical sites may be unaware of the presence and actions of operators at other sites.

The second and third forms share the additional disadvantages of potentially leaving firmware or configuration storage areas in a switch 14 corrupted, at least until a successful retry can be accomplished, and being dependent upon the timing of switch 14 and operator events and as a possible result leaving the switch 14 in an indeterminate state.

As discussed above, sensitive command sequences may conflict with each other when issued concurrently from different nodes 12. The "take ownership" command simplifies the actual implementation of switch maintenance services, but will not necessarily eliminate the need to plan for maintenance.

The present invention uses a lock mechanism that supplements the "take ownership" command. The lock mechanism is in addition to, and should not be confused with, the "take ownership" command. The lock mechanism can be described at a high-level as a coordination protocol in which nodes 12 agree to issue a "take ownership" command to a switch 14 only after obtaining control of a lock stored in the switch 14. Under this protocol, the switch lock is controlled by at most one node 12 at any given time.

As will become apparent, this locking mechanism provides the following functionality:

1. Assurance that a switch 14 is not owned before allowing a lock client process 18 to obtain ownership.
2. Assurance that no other lock client process 18 can steal valid switch ownership, once a viable lock client process 18 has obtained it.
3. A mechanism to indicate that there is no effective current ownership of the switch 14.
4. A mechanism to allow surrender of ownership in case of the owning lock client process 18 becoming moribund.
5. Provide all of the above transparently to the end user.

The methods and apparatus disclosed herein prevent cooperating lock client processes 18 from interfering with each other's attempts to perform maintenance. Thus, it is not necessary for operators to coordinate switch maintenance activities. Cooperating lock client processes 18 will not steal ownership from a viable owner. Once activated, maintenance functions should always run to a successful conclusion, barring extraordinary conditions (e.g. software errors, hardware failures, etc.).

Hence, when a first process holds ownership of the switch 14 and a second process attempts to acquire it and fails, it is the attempt by the second process that fails and the second process is notified. This is understandable at a human interface level, since no process that was initially successful is suddenly changed to a failing state. If it is unable to obtain ownership, a sensitive operation fails before any actual maintenance commands are issued. As a result, no switch firmware or configuration data will be left in a corrupted state due to being partially updated.

In addition, the timing sensitivity of maintenance commands on various nodes 12 is reduced. If two lock client processes 18 attempt to conduct a sensitive operation at approximately the same time, the first gets ownership of the switch 14. The second lock client process 18 will never actually attempt to take ownership, and, consequently, will not attempt to have its sensitive commands executed. However, automatic retries may result in ownership subsequently being obtained by the second lock client process 18, before it becomes necessary to recognize a failure and notify a human operator. In this case, both functions appear, to the operators, to have worked immediately.

In the case of a lock client process 18 receiving notification of a failure to obtain ownership of a switch 14, the client action is simply to retry a predetermined number of times.

One advantage of the "take ownership" command is simplicity of implementation. Namely, a command sequence formed within or outside of the SANMAN process is easily marked as being sensitive by preceding the sequence with a "take ownership" command. In contrast, the implementation of a lock mechanism is more complex (as will become apparent). The implementation of the lock mechanism is however facilitated by keeping it separated and orthogonal to the "take ownership" command. Under this paradigm, the lock mechanism can be fully implemented with two components: a software component that runs on the nodes 12 and a lock server implemented in the switches 14. The software component that runs on the nodes 12 can be fully contained within the SANMAN process, and can be completely hidden from external software layers including human interface and diagnostic software layers. In this embodiment, the SANMAN process examines every command sequence before sending the sequence to a switch 14, regardless of whether the command sequence was formed within or outside SANMAN. If the first command in the command sequence is a "take ownership" command, SANMAN determines that the command sequence is sensitive, and proceeds to try to obtain a switch lock before sending the command sequence to the switch 14. Otherwise, the command sequence is not sensitive and can be sent directly to the switch 14, without it being necessary to obtain a switch lock.

Before proceeding further with the description of the system, some terminology should be explained. The "lock" (noun) is the representation in the system of the current state of ownership of the resource to be maintained (the switch 14), and is the mechanism whereby ownership is regulated. In the described embodiment, the lock is a set of data fields held in a random access memory of the switch 14, and the node 12 (or more correctly, a lock client process 18 running on the node 12) having ownership (i.e. the node/process "holding the lock") is identified in one of the data fields. The structure of the lock is described in more detail below with reference to FIG. 2. To "force a lock" is to obtain the lock even though it is nominally held by another process. When a "lock is not held" then the process in question does not hold the lock. The lock may or may not be held by some other process. When a "lock is already held" then the process in question holds the lock. A "reacquire" is when a process that already holds the lock obtains the lock again. This is normally done to refresh an "owner viable" field in the lock.

In the illustrated embodiment, a plurality of locks is implemented as an array 17 in switch firmware. The lock array is accessed and utilized by lock client processes 18 running in each of the nodes 12. The lock client processes 18 interact with the lock array 17 by means of lock instructions 20. A lock instruction 20 sent by a lock client process 18 to a switch 14 is also referred to as a lock command (e.g. the Switch Set Lock Instruction 22 of FIG. 2). In the illustrated implementation, only one lock (lock number 0), defined as the ownership lock, is used. A lock client process 18 must obtain the ownership lock before it can send a "take ownership" command to the switch 14. The remaining locks are reserved and may be used in future implementations. One possible use of additional locks is to provide finer granularity of control—namely, separate locks may be defined for sensitive command sequences that are not mutually conflicting. For example, a firmware download management action typically does not conflict with a configuration download management action, because these actions write to separate memories in the switch 14. With separate locks for firmware download and configuration download, these actions can be performed simultaneously on a switch 14. This provision may facilitate the availability of very large clusters in which the external fabrics may include several interconnected switches 14. For such clusters, it is important to keep the duration of maintenance actions as short as possible, for example when upgrading the firmware and configuration of several switches 14.

The switch 14 itself is not responsible for resolving conflicts relating to different sets of sensitive commands that are intended to be run on the switch 14—the lock client processes 18 determine (based on the contents of the data fields comprising the lock) the appropriate steps to take in any particular situation. The switch 14, however, is not entirely passive—it is responsible for managing the lock itself. For example, the switch 14 will not write a lock client process's identity into the "owner" field in the lock unless the test field in the Switch Set Lock Instruction 22 matches the current content of the owner field in the appropriate lock array entry. When the contents of the lock fields are sent to the requesting process in response to an unsuccessful attempt to obtain the lock, the requesting process will determine that its identity is not in the "owner" field of the lock and that it is hence not authorized to execute sensitive commands. Having determined that it does not hold the lock, it will not send the sensitive commands to the switch 14, and will try to obtain the lock again at some later time. That is, from the client (user) side, locking is implemented as a protocol. All lock client processes 18 agree to use the protocol and are therefore protected by it.

Figure 2:
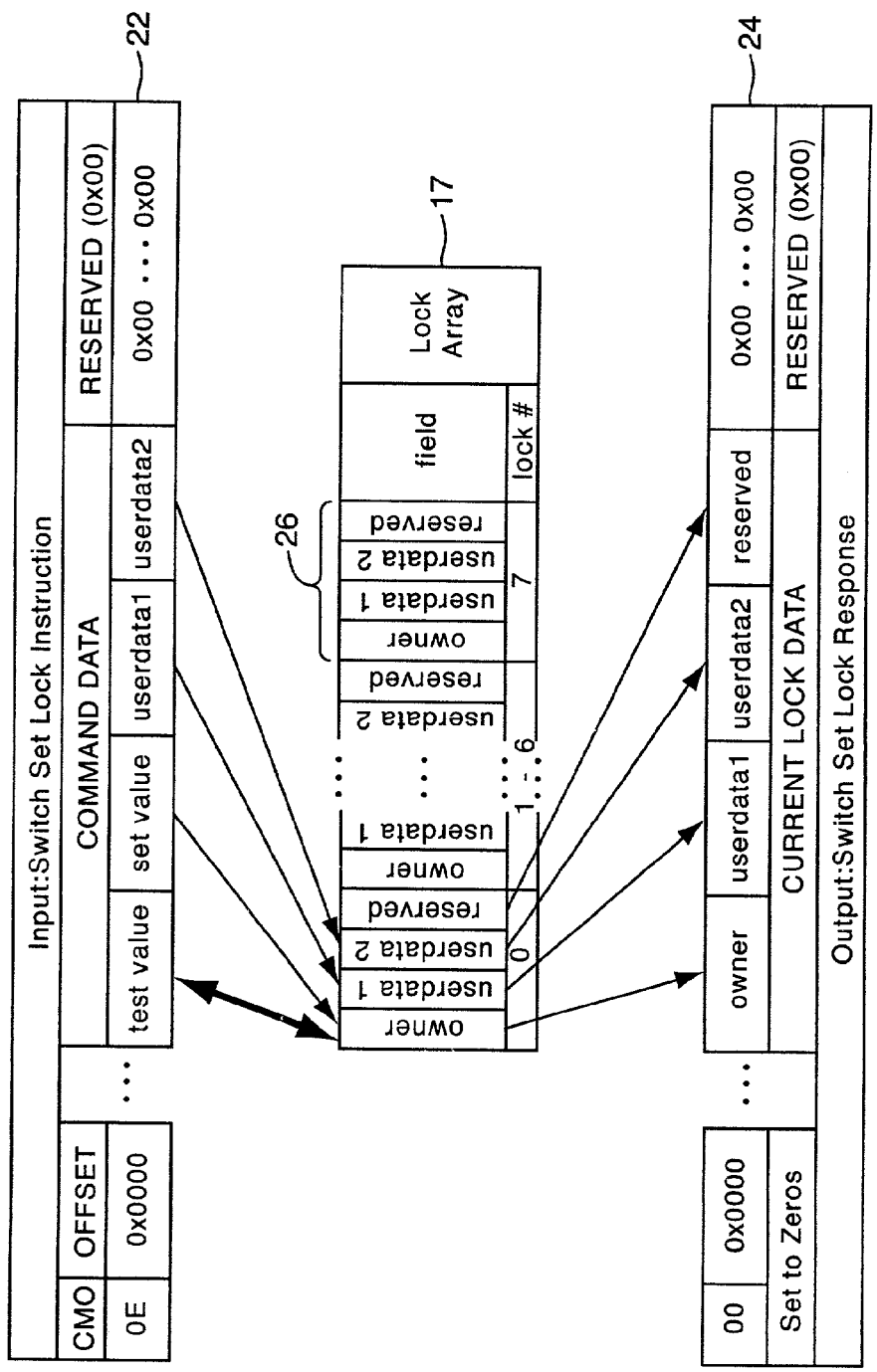
FIG. 2. is a diagram illustrating data and command structures for use in the network system of FIG. 1.

FIG. 2 shows the lock array 17 in more detail, as well as a Switch Set Lock Instruction 22 (a lock instruction is typically sent to the switch 14 in the payload of an IBC request packet) and a Switch Set Lock Response 24 (a response by the switch 14 to the Switch Set Lock Instruction 22 is typically sent in the payload of an IBC response packet).

The illustrated lock array 17 has eight locks 26 which are numbered from 0 through 7. In the illustrated implementation, only one lock (lock number 0), defined as the ownership lock, is used. The remaining seven locks are reserved and may be used in future implementations, as discussed previously.

Each of the eight locks 26 is structured as follows:

Bytes 0–3=current lock owner identification.

Bytes 4–7=proof of viability of current lock owner (user data 1).

Bytes 8–11=retain interval, after which the proof of viability field must be updated if the current owner is to be considered viable (user data 2).

Bytes 12–15=reserved for possible use in future implementations.

All the fields of all the locks 26 are initialized to zero by the switch 14 on all resets, including initial power on reset.

The Switch Set Lock Instruction 22 causes the switch 14 to perform a test instruction and a set instruction as a single ("atomic") unit of operation (as viewed by the requesting lock client process 18). The Switch Set Lock Instruction 22 consists of a standard IBC packet header and thirty-two (32) bytes of data sent by the lock client process 18 to the switch 14. The lock to be used (the selected lock, lock 0 for all cases described herein) is passed as an address field in the standard IBC packet header. The Switch Set Lock Instruction's data comprise:

Bytes 0–3=a test value (typically, but not always, the hexadecimal value 0x00000000, the expected value when no lock client process 18 holds the lock.

This can be "faked" by a non-owner process to force a lock as described in more detail below).

Bytes 4–7=a set value (the identity of the owner that is to be written into the owner field of the lock 26 if the test value above matches the current value of the lock's owner field).

Bytes 8–11=proof of viability of current lock owner (user data 1).

Bytes 12–15=retain interval, after which the proof of viability field must be updated if the current owner is to be considered viable (user data 2).

Bytes 16–31=reserved, should be set to zero.

Each lock client process 18 uses a unique and distinct lock owner ID when constructing a Switch Set Lock Instruction 22. The lock owner ID is conveyed in bytes 4–7 (i.e., the set value) of the Switch Set Lock Instruction 22. An appropriate choice of lock owner ID are unique network addresses or manufacturing serial numbers in use by each of the nodes 12 in which the lock client processes 18 run. In one embodiment, the nodes 12 are Compaq™ Himalaya S-Series™ servers and the lock owner ID is the Compaq™ Expand Network node number of each node 12. The Compaq™ Expand Network defines a network architecture to interconnect Compaq™ Himalaya S-Series™ servers. The Expand Network node number is guaranteed to be unique for each node 12 in the same Expand Network (the Expand Network architecture includes provisions to detect and reject nodes 12 with duplicate Expand Network node numbers). An embodiment of the network cluster 10 (namely, a Compaq™ NonStop™ ServerNet™ Cluster) is one of the possible network connectivity technologies available to configure a Compaq™ Expand Network.

The proof of viability value is typically the low order (rightmost) thirty-two bits of a sixty-four bit time-of-day clock value with a 1-microsecond granularity. The value of the proof of viability field is based on a clock value to ensure that the proof of viability is always changing. If it remains constant from retain interval to retain interval, the owner is no longer functioning correctly and is thus no longer viable. The low order thirty-two bits of the time-of-day clock value resets back to the same initial value once every $2^{32}$ microseconds, or approximately once every 1 hour, 11 minutes, and 35 seconds. Because this interval is far longer than the typical duration of the retain interval, the low order thirty-two bits of the time-of-day clock value is an adequate choice for the proof of viability field. Other suitably varying or suitably random numbers may be used in the proof of viability field.

The retain interval is an assigned program constant. This value is typically selected so that the longest known sensitive command set should complete within a single retain interval. This is desirable to minimize and possibly avoid additional SANMAN software and switch firmware overhead due to periodic lock reacquires (even though such overhead is typically very small or even negligible). More importantly, however, the retain interval should not exceed a few minutes. Otherwise, management actions could be delayed due to retries when a lock owner becomes moribund and the lock must be forced (this is because the retry interval is typically at least twice the retain interval). In a typical implementation, sensitive operations such as firmware and configuration download will normally complete in less than one minute, and consequently a retain interval of about one minute is adequate. However, the download may take as many as four minutes in the worst case, particularly if IBC protocol communication errors occur and one or more IBC packets within the same sensitive command sequence must be retransmitted. If communication errors cause a sensitive management action to take longer than normal, the lock client process 18 will reacquire the lock at the expiry of periodic retain intervals to ensure that the management action completes.

The preferred ratio of two between the retry and retain intervals is intended to give the owning client process sufficient time to update the viability data between retries. However, if the implementor is willing to accept more risk, the ratio could be reduced to a smaller value to accelerate the retries performed by the client process. The ratio should however not be made less than one since this would allow multiple retries before the current lock owner has had a chance to update the viability data in the lock. Also, to allow for some margin of tolerance for non-zero latencies in hardware, software, and firmware performance, practical factors in most systems will typically dictate a minimum ratio greater than 1 (such as 1.25).

The Switch Set Lock Response 24 duplicates the standard IBC packet header and returns thirty-two bytes of data. The returned data comprises:

Bytes 0–3=current value of the lock's owner field.

Bytes 4–7=current value of the lock's proof of viability field.

Bytes 8–11=current value of the lock's retain interval field.

Bytes 12–31=reserved, should be set to zero.

Figure 3:
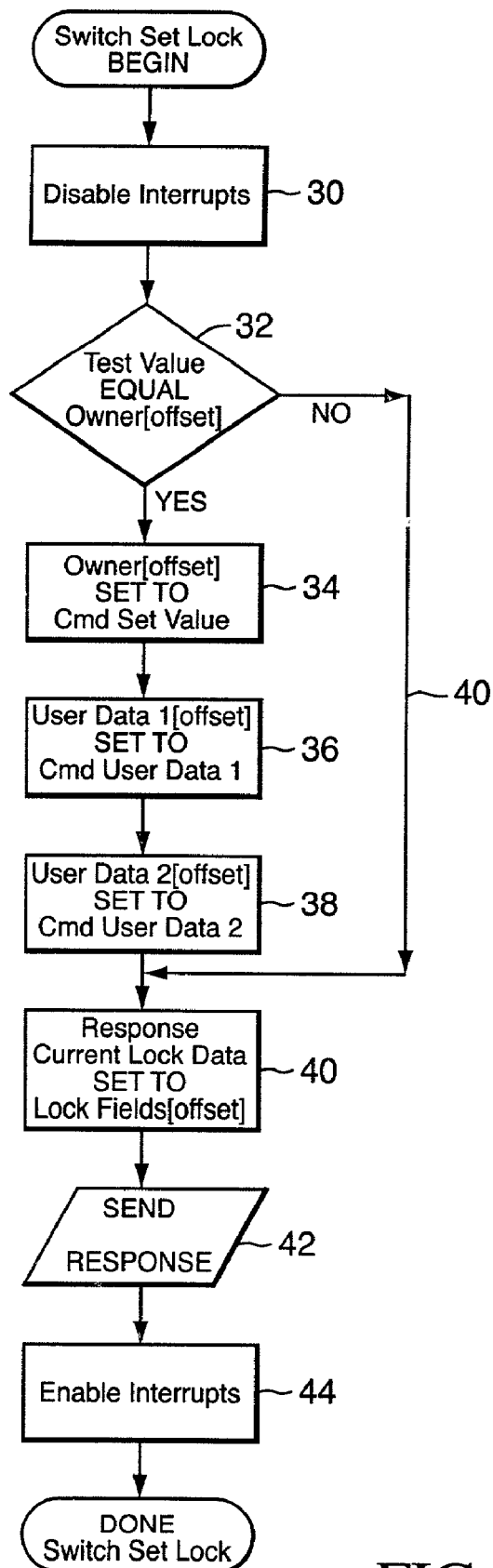
FIG. 3. is a flowchart illustrating the handling of a Switch Set Lock Instruction by the switch of the network system of FIG. 1.

As shown in FIG. 3, when receiving a Switch Set Lock Instruction 22, the switch 14 first disables its interrupts at step 30. The switch 14 then extracts the test value from the Switch Set Lock Instruction 22 and compares it to the owner field in the selected lock at step 32.

If the test value and the owner value are equal, then:
The switch 14 extracts the set value from the Switch Set Lock Instruction 22 and stores it in the owner field of the selected lock at step 34.
The switch 14 then extracts the proof of owner viability data from the Switch Set Lock Instruction 22 and stores it in the lock's proof of owner viability field at step 36.
The switch 14 then extracts the retain interval from the Switch Set Lock Instruction 22 and stores it in the lock's retain interval field at step 38.

If the test value and the owner value are not equal, then the switch 14 does not modify the contents of the selected lock and proceeds to step 40.

The switch 14 then prepares, at step 40, a Switch Set Lock Response 24 to the Switch Set Lock Instruction 22. In the response, the IBC packet header is properly initialized, the 32-byte data field in the packet is set to all zeros, and then the current contents of the selected lock are copied to the first sixteen (16) bytes of the Switch Set Lock Response 24.

The switch 14 then sends the Switch Set Lock Response 24 to the requesting lock client process 18, at step 42, and enables its interrupts at step 44.

The switch 14 provides these lock facilities but makes no further use of them in this embodiment. Further, from a viewpoint of the switch 14, there is no requirement that any lock be held before any other command may be executed. The switch 14 is the repository for lock data. It takes no further interest in the state of the locks or their data.

It is noted that the illustrated embodiment is implemented with only the first lock, defined as the ownership lock, being used. The remaining seven locks are reserved and can be used in future implementations.

As mentioned above, from the client (user) side, locking is implemented as a protocol. For example, the protocol specifies that no user may request switch ownership via a "take ownership" command unless it first holds the ownership lock. The protocol further specifies that:

- The value of the lock owner ID, when a lock is not held, is zero (0x00000000).
- The success or failure of an attempt to obtain a lock is determined by a lock client process 18 from the values returned by the switch 14 in the first two lock data fields of the Switch Set Lock Response 24. For a lock client process 18 to have obtained the lock, a) the current (returned) value of the lock owner must be equal to the set value sent to the switch 14; and b) the current (returned) value of the proof of owner viability must be equal to the proof of viability sent to the switch 14. If both of these conditions are met, the lock was obtained successfully, otherwise the lock client process 18 failed to obtain the lock.
- If a lock is obtained by a lock client process 18, it must normally be released by the same lock client process 18.
- If a lock is obtained, and is to be held for longer than the agreed-upon interval (the retain interval) it must be reacquired at least once every retain interval.
- A held lock may be stolen if the holding lock client process 18 does not provide proof of viability at least once in each retain interval.
- There is no automatic retry to obtain the lock at the switch level. If an attempt to obtain a lock not held fails, it is the responsibility of the lock client process 18 to perform retries.
- The lock client process 18 should wait a period at least twice the retain interval between retries to obtain a lock.
- The lock client process 18 that uses a lock is responsible for the maintenance of lock information.

As will be apparent, a lock client process 18 that intends to perform sensitive operations on a given switch 14 uses these methods to ensure a) that no other lock client process 18 already owns the switch 14; b) that, once a viable lock client process 18 has taken ownership of a switch 14, no other lock client process 18 can steal it; and c) that the death of the current owner does not cause the switch ownership to become permanently unavailable.

In the illustrated embodiment, the lock client processes 18 are embodied as distributed System Area Network Manager (SANMAN) processes. The SANMAN process acts as a server to operators or management programs that need to perform operations on a switch 14.

The operation of the cluster 10 is described in more detail below with reference to the attached figures. However, to provide an introduction to the later detailed description, the operation of the lock client processes 18 will now be described briefly.

When a lock client process 18 receives a request from an operator or a management program, it creates a set of commands to be sent to the switch 14. If the set includes sensitive commands, the first command in the set will be a "take ownership" command. In this case, the lock client process 18 attempts to obtain the switch ownership lock via a Switch Set Lock Instruction 22 before sending the "take ownership" and remaining sensitive commands to the switch 14.

Note that the Switch Set Lock Instruction 22 must be sent to the switch 14 separately from the set of commands for which the lock is required. This is because the command set includes the "take ownership" command and this command can only be sent when the lock is successfully obtained.

A normal attempt to obtain a lock (i.e. not when forcing a lock) assumes that the lock is currently not owned, and specifies all zeros (0x00000000) as the test value in the Switch Set Lock Instruction 22. The set value is the lock client process's own identifier. The Switch Set Lock Instruction 22 is then sent to the switch 14, which executes the Switch Set Lock Instruction 22 as described above with reference to FIG. 2.

If the lock is successfully obtained, the lock client process 18 sets a timer for the length of the retain interval; and sends the take ownership and the set of sensitive commands to the switch 14. When the complete set has been sent to, and acknowledged as being completed by, the switch 14, the lock client process 18 releases the lock and sends a reply to the original requester. The lock release is accomplished by the lock client process 18 by sending a Switch Set Lock Instruction 22 whose test value is set to the ID of the lock client process 18 and whose set value, proof of viability, and retain interval fields are set to all zeros (0x00000000).

If the retain timer expires before the complete set of commands can be sent, the lock client process 18 directs a new Switch Set Lock Instruction 22 to the switch, using its own ID as both the test value and set value in the command. In this case, a new value is derived for the proof of viability data by again reading the sixty-four bit time of day clock and using the low order thirty-two bits as the proof of viability value. The Switch Set Lock Instruction 22 is assumed to have been successful in both the lock release and lock reacquire instances, since this particular lock client process 18 is known to be the lock holder.

If the lock is not successfully obtained, processing depends upon whether this was an original attempt or a retry. For a failed original attempt, the lock client process 18 stores the lock status information returned by the switch 14, sets a retry timer for twice the retain interval and leaves the set of sensitive commands pending. When the retry timer expires the lock client process 18 again attempts to obtain the lock, as described above. For a retry, the lock holder is tested for viability.

For the current lock holder to be considered viable by a process trying and failing to obtain the lock, either the lock holder identification or the value of the proof of viability field must change between each of said process's attempts. Note that, for this test, the actual values in the proof of viability field are not significant, only that they be different.

If the holder is judged to be viable, a retry limit is tested as follows:

- When the limit of retries has been reached, the lock client process 18 replies to the end user's request, indicating that the request has failed because the lock could not be obtained. In this case, the set of commands has never been sent to the switch 14.
- When the limit has not been reached, the lock client process 18 sets a timer for twice the duration of the retain interval and leaves the set of sensitive commands pending. When the timer expires, the lock client process 18 again attempts to obtain the lock, as described above.

If the lock holder is judged to have failed (i.e., it is no longer viable), the lock client process 18 forces the lock. This is accomplished by building a Switch Set Lock Instruction 22 with a test value equal to the lock owner value last returned by the switch 14. By setting the test value equal to the current (dead) lock owner's ID, the forcing lock client process 18 "deceives" the switch 14 into allowing the forcing lock client process 18 to alter the values in the lock. The set value in the forcing Switch Set Lock Instruction 22 is the owner ID of the forcing lock client process 18. The proof of viability and the retain interval are set in the usual manner. When a forcing Switch Set Lock Instruction 22 is sent to the switch 14, the Switch Set Lock Response 24 received in response is treated as if it were a response to an original attempt to obtain the lock. Note that in this implementation, when the lock is forced it becomes immediately owned by the forcing process. However, this is not a requirement, and the forcing process may elect to force the lock to a not-owned state (i.e. owner value equal to 0x00000000).

Under very unusual circumstances, it is possible that a "dead" lock client process 18 that formerly owned the lock comes alive and starts transmitting sensitive commands after the lock is forced by another lock client process 18. Normally, this is not expected because sufficient time (in the form of a retain interval) is provided for a "healthy" lock client process 18 to present proof of viability by reacquiring the lock. A possible (but unlikely) scenario in which a "dead" lock client process 18 may come alive and start transmitting sensitive commands could be a node 12 transiently subject to an unusually high processing load. If the lock client process 18 on that node 12 is not given sufficient priority to run, it may appear to be "dead" to lock client processes 18 running on other nodes 12. After the processing load on the node 12 running the "dead" lock client process 18 subsides, the "dead" lock client process 18 may attempt to continue transmitting sensitive commands. The transmission will typically resume wherever the sensitive command sequence had been interrupted.

If the command sequence had been interrupted after its first command (which is the "take ownership" command), the commands transmitted by the "dead" lock client process 18 will simply be rejected with NACK responses sent back by the switch 14. These NACK responses are expected and are returned when a lock client process 18 sends sensitive commands without currently owning the switch 14. If the command sequence had been interrupted precisely before its first command (i.e., the "take ownership" command) was sent to the switch 14, the "dead" lock client process 18 will succeed in taking ownership back to itself in a way that potentially violates the lock mechanism described herein. As mentioned above, this situation would be highly unusual, and in fact it can be made virtually impossible by configuring the lock client processes 18 with sufficiently high priority. This ensures that a lock client process 18 will never be substantially starved by other processing loads running on the same node 12. If desired, another safeguard against this unusual scenario can be incorporated in the lock client process 18 itself, such as having the lock client process 18 store a time-of-day timestamp whenever it acquires a switch lock. Prior to sending a "take ownership" command to the switch 14, the lock client process 18 can compare the current time against the stored time of when it last acquired the lock. If a time interval longer than the retain interval has elapsed, there is risk that the lock client process 18 may have been considered "dead" by another lock client process 18, and the switch lock may have been forced by that other lock client process 18. The "dead" lock client process 18 may in this unusual situation decide to abort the transmission of sensitive commands to the switch 14, and return an error message to the operator. In this case, the belated sensitive command sequence would never have been sent to the switch 14, and the operator may choose to retry the management action upon receiving an error message.

Figure 4:
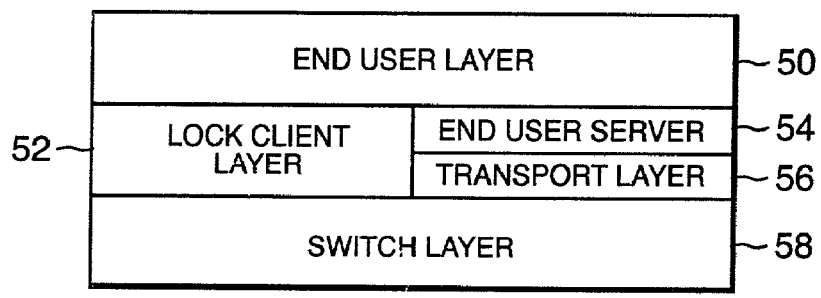
FIG. 4 is a schematic diagram illustrating the various layers of an implementation of the management stack for the system of FIG. 1.

The logical structure of an exemplary embodiment of the invention is shown in FIG. 4. As can be seen from the figure, a three-layered implementation is provided for the management stack. The first layer of the implementation is the end-user layer 50. The end-user layer 50 is unaware of the need for a lock. In fact, the only requirement at this level is that the user be aware of and properly handle the error response that indicates that a sensitive command set failed because the lock could not be obtained. In the preferred implementation, the "proper" handling is to delay some period of time and then retry the failing function.

At this level, an end user (e.g. an operator) or a management program (e.g. the Compaq™ Total Service Manager "TSM") makes a request to a lock client process 18 that some function be performed at a designated switch 14, on a designated fabric. The request is typically delivered to the lock client process 18 running on the same node 12 where the operator is logged on or where the management program is running. When the lock client process 18 has processed the command, the result is returned to the end-user layer 50. The originator checks the result and makes decisions for further processing based on the response. If the response indicates that the request was refused because a lock could not be obtained, the most likely reaction is to retry the requested operation, perhaps after some time delay.

The second layer (corresponding to lock client process 18 of FIG. 1) is the distributed lock client layer 52 that has knowledge of the lock and when it is required for the lock to be owned. This layer implements the lock protocols by providing the methods to request, check, retry, reacquire, and release the lock. The lock client layer 52 also provides all the necessary ancillary functions that support the various methods (e.g. error handling, timer facilities, memory allocation for data structures, etc.).

Figure 5:
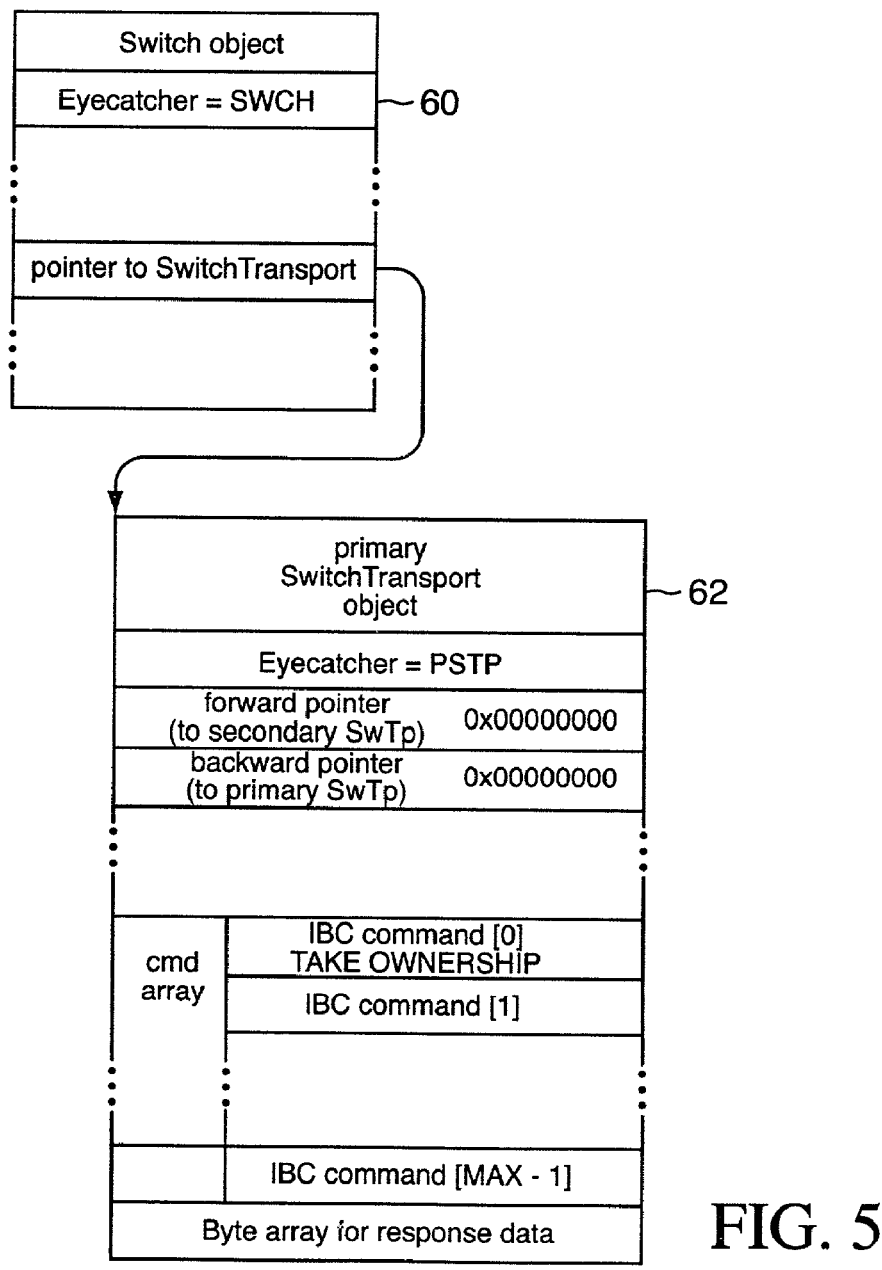
FIG. 5. illustrates the Switch and Switch Transport objects that are utilized by an object-oriented implementation of the lock client of the network system of FIG. 1.

In an object-oriented implementation of the invention, functioning of the lock client layer 52 is based upon two objects—shown in more detail in FIG. 5—provided as part of the lock client layer 52. The first object is a Switch object 60 that contains information and methods relative to a given switch 14 in an external fabric. The Switch object 60 contains a set of flags to indicate what locks, if any, in this switch 14 are owned by this instance of the lock client process 18. The Switch object 60 also includes fields for storing the lock information for any locks that this process holds or has attempted to obtain.

The second object is a SwitchTransport object 62 that contains data and methods needed to send commands to and receive responses from a given switch 14 in an external fabric. Although there may be a one-to-one relationship between the Switch object 60 and the SwitchTransport object 62, this implementation provides for the concept of a primary SwitchTransport object 62 and a secondary SwitchTransport object 64. The SwitchTransport object created at process initialization time is designated as the primary SwitchTransport object 62. The primary SwitchTransport object 62 contains the command set that is to be run on the switch 14. The secondary SwitchTransport object 64 is a temporary object that is used to acquire the lock, The secondary SwitchTransport object 64 normally includes only one switch command—the Switch Set Lock Instruction 22. If the lock is successfully acquired, the secondary SwitchTransport object 64 is deleted.

The lock client layer 52 is divided into two sub-layers, an end-user server sub-layer 54 and a transport service sub-layer 56.

Figure 6:
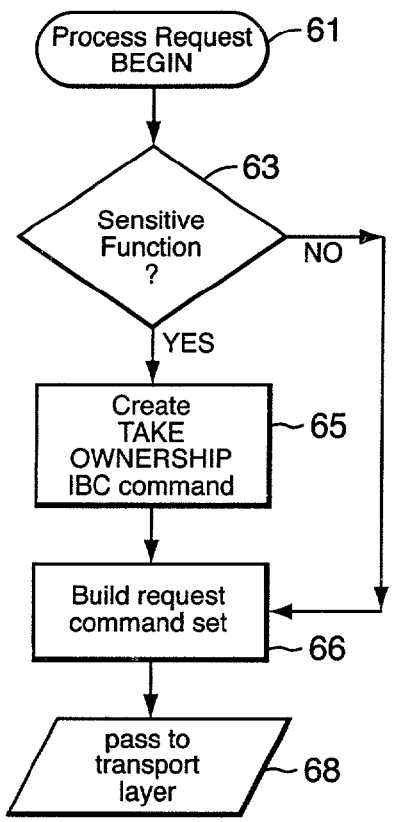
FIG. 6 is a flowchart illustrating the handling of requests by the end-user server sub-layer of FIG. 4.

As shown in FIG. 6, the end-user server sub-layer 54 receives, at step 61, a request from the user or from an internal function such as a timer expiration. The end-user server sub-layer 54 decodes the request and formats a set of commands to be sent to the switch 14. In a Compaq™ System Area Network Manager (SANMAN) implementation, these commands are known as In-Band Control (IBC) commands.

These commands are stored in command buffers in a primary SwitchTransport object 62. If ownership of the switch 14 is necessary for execution of the commands in the buffer (i.e. sensitive commands are to be executed in the switch 14 as determined by step 63), the first command in the command array will be a "take ownership" command, created at step 65. After the command set has been built at step 66, control is passed at step 68 from the end-user server 54 to the transport service 56 to send the commands to the switch 14. At this point, the Switch object 60 is pointing to the primary SwitchTransport 62 object and vice versa. That is, when the Switch object 60 is required to call a SwitchTransport object, it will call the primary SwitchTransport object 62, and when completed, the primary SwitchTransport object 62 will return control to the Switch object 60.

Figure 7:
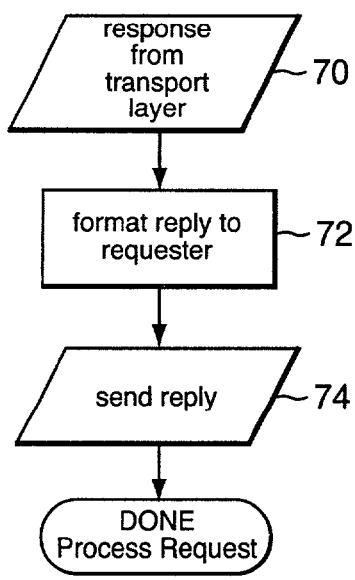
FIG. 7 is a flowchart illustrating the handling by the end-user server sub-layer of responses from the transport sub-layer of FIG. 4.

As shown in FIG. 7, when control returns from the transport service 56 at step 70, the end-user server 54 formats, at step 72, and sends, at step 74, an appropriate response to the end-user layer 50.

The transport service 56 executes the methods provided by the Switch and SwitchTransport objects described above and maintains their data content. The transport service 56 sends the commands in the buffers of the SwitchTransport object 60 to the switch 14 and handles the switch's responses, including the storing of any returned data.

Figure 8:
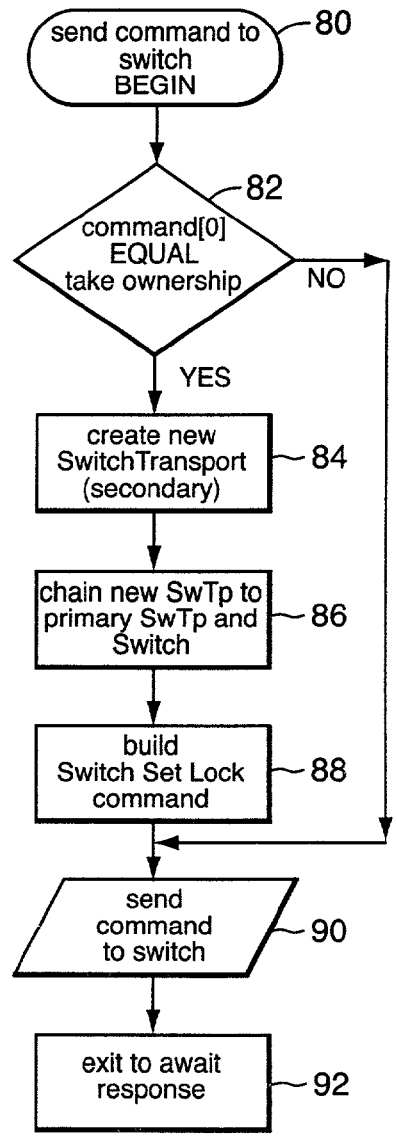
FIG. 8 is a flowchart of the InitiateSend and SendCurPkt routines executed by the transport sub-layer of FIG. 4.

The end-user server 54 passes control to the transport service 56 by calling an InitiateSend routine. This routine initializes the required data in the SwitchTransport object and calls a SendCurPkt routine. The function of the SendCurPkt routine is to send the next command in the SwitchTransport object's command buffer to the switch 14, then to exit to a wait function. In this wait state, the lock client process 18 waits for a Switch Set Lock Response 24 from the switch 14. FIG. 8 is a flowchart representing the InitiateSend and SendCurPkt routines.

The transport layer always begins a new transaction with the InitiateSend routine, at step 80. This routine checks, at step 82, the first command slot in the buffer (in the primary SwitchTransport object 62) for the presence of a "take ownership" command.

If the command is not "take ownership" then the command is sent at step 90 to the switch 14 in the normal manner and the lock client layer 52 gives up control at step 92 to await the next event, normally an interrupt generated when the switch response packet for this command is received. Typically, after sending a command, the transport service 56 also starts a timer to impose a limit on waiting for a response packet from the switch 14. The transport service 56 receives a timer interrupt indicating a timeout if a response packet is not received from the switch 14 within a prescribed wait interval (typically in the order of 400 to 600 milliseconds). If a timeout occurs, the transport service 56 assumes that either the command or the response was lost due to a communication error with the switch 14, and resends the original command packet. After a maximum number of retries (typically three) without a response being received from the switch 14, the transport service 56 aborts the command sequence transmission, and completes the user request with an error indicating that the switch 14 did not respond to the requested management action. Under normal conditions, when a response packet is received from the switch 14, the transport service 56 stores it and sends the next command in the buffer, if any, to the switch 14. When all commands in the buffer have been sent (using the SendCurPkt routine of FIG. 8) and have been responded to, the transport service 56 sets a completion code and passes control back to the end-user server 54 to send a reply back to the end-user layer 50 as shown in FIG. 7.

Figure 9:
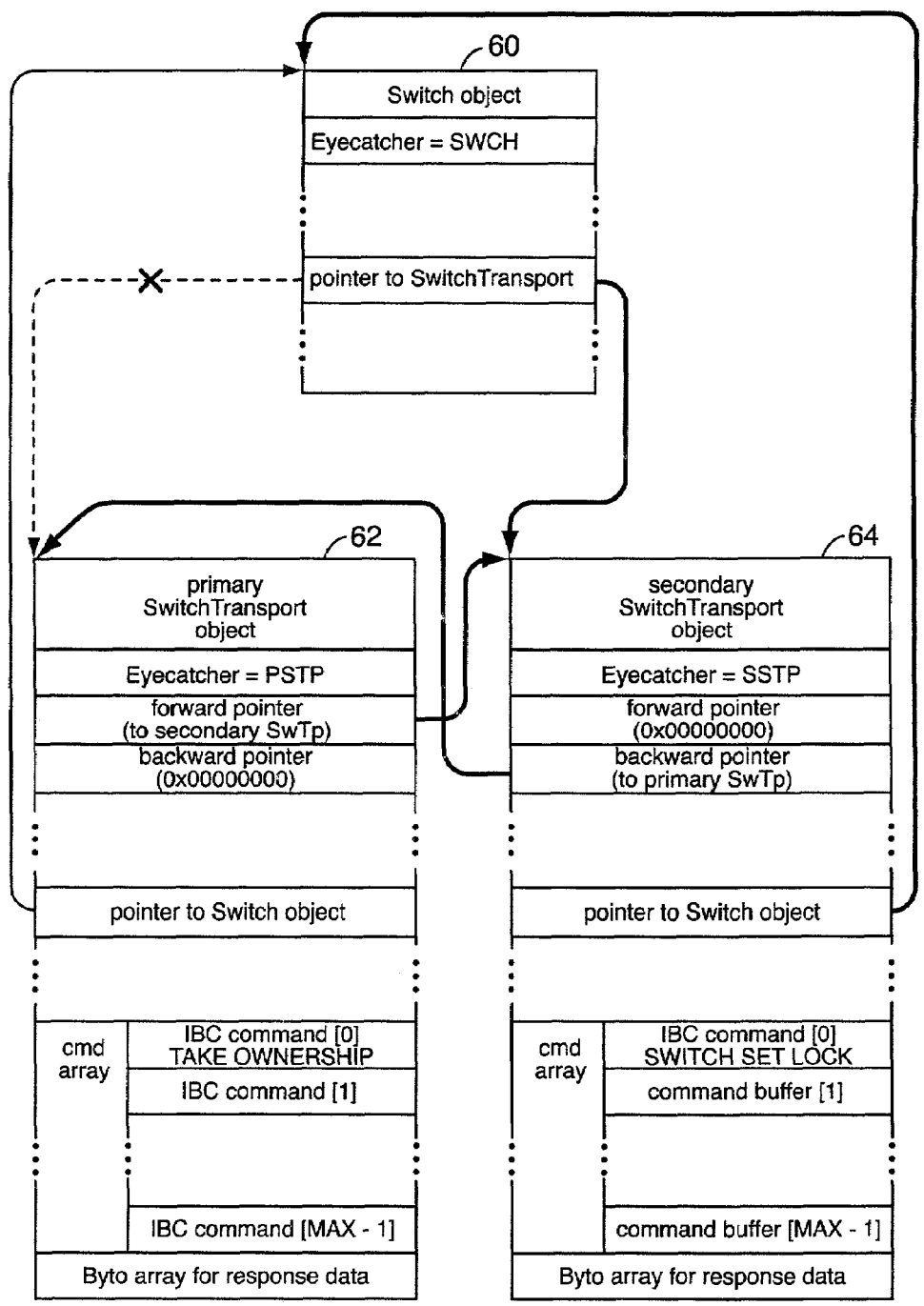
FIG. 9 illustrates the Switch, Primary Switch Transport and Secondary Switch Transport objects that are utilized by an object-oriented implementation of the lock client of FIG. 1.

If the first command is "take ownership" then the transport service 56 creates at step 84 a new SwitchTransport object (designated the secondary SwitchTransport object 64) and chains it at step 86 to the original (primary) SwitchTransport object 62 and to the Switch object 60 as shown in FIG. 9. That is, the primary SwitchTransport object 62 points forward to the secondary SwitchTransport object 64 and the secondary SwitchTransport object 64 points backwards to the primary SwitchTransport object 62. The transport service 56 also replaces the SwitchTransport object pointer in the Switch object 60 with a pointer to the secondary SwitchTransport object 64. The transport service 56 then creates at step 88 a single command (a Switch Set Lock Instruction 22) in the secondary SwitchTransport object 64. This command is then sent at step 90 to the switch 14, and the transport sub-layer 56 gives up control at step 92 to await a response packet interrupt or a timer expiration interrupt due to the response timing out. Note that step 90 represents the SendCurPkt routine, which has for convenience been integrated with the InitiateSend routine in the flowchart shown in FIG. 8. The SendCurPkt routine may also be called independently, i.e. apart from the InitiateSend routine.

When the switch 14 has completed processing a command and a response is received, the transport service 56 is awakened by an interrupt. Processing of the response depends upon the command type and the status of the command buffers in the SwitchTransport object.

When the active SwitchTransport object contains additional commands not yet sent to the switch 14, control returns to the SendCurPkt routine at step 90 to send the next command. In the current implementation, the active SwitchTransport object would have to be a primary SwitchTransport object 62, since a secondary SwitchTransport object 64 in the current implementation does not have more than one command (the secondary SwitchTransport object holds only a Switch Set Lock Instruction 22).

When all the commands in the active SwitchTransport object have been sent to the switch 14, processing of a response from the switch 14 depends upon the type of operation being performed on the switch 14. The different scenarios are described below.

1. When the operation type is a writeread to the switch 14 (i.e., a test-and-set operation such as the Switch Set Lock Instruction 22), processing proceeds as follows. Firstly, a CheckLockResult routine implemented in the Switch object 60 is invoked to determine if the lock was successfully obtained or released. The CheckLockResult routine compares the value in the owner field of the Switch Set Lock Response 24 with the set value sent in the Switch Set Lock Instruction 22. When a lock has been released, these values will both be all zeros. When a lock has been obtained, these values will both be equal to the owner ID of the lock client process 18.

When the lock is released, the following steps are performed by the lock client process 18:

Reset the lock data in the Switch object 60 with the data returned by the switch 14.

Delete the secondary SwitchTransport object 64.

Unchain the deleted secondary SwitchTransport object 64 from the primary SwitchTransport object 62.

Set the pointer in the Switch object 60 back to the primary SwitchTransport object 62.

Reset lock information stored in the primary SwitchTransport object 62.

Invoke the end-user server sub-layer 54 to generate a response to the original requester.

Note also that release attempts are assumed to be successful since the "releaser" is the lock holder and is not actually competing for the lock. However, there is a failsafe in place here. Prior to sending the release version of the Switch Set Lock Instruction 22 to the switch 14, the retain interval timer is cancelled. If the command fails, and the switch based lock remains set, it will not be reacquired. Thus, the next lock client process 18 that attempts to obtain it will be able to force the lock on the second attempt (first retry).

When the lock is successfully acquired by a Switch Set Lock Instruction 22, the following steps are performed:

Set a timer for the duration of the retain interval.

Delete the secondary SwitchTransport object 64.

Unchain the deleted secondary SwitchTransport object 64 from the primary SwitchTransport object 62.

Set the pointer in the Switch object 60 back to the primary SwitchTransport object 62.

Invoke the SendCurPkt routine to send the commands in the primary SwitchTransport object 62 to the switch 14.

When the lock has not been obtained by a Switch Set Lock Instruction 22, the following steps are performed.

NOTE: Each entry to the following steps decrements the count of retries remaining.

If this was the initial attempt to obtain the lock, then set a timer for the duration of a retry interval, save the lock information returned by the switch 14 into the Switch object 60 and exit to wait for the retry interval to expire.

If this was a retry, then

Invoke a LockholderAlive routine implemented in the Switch object 60 to determine if the current owner is still viable. The LockholderAlive routine compares proof of viability data returned in two subsequent Switch Set Lock Responses 24. If the proof of viability data are not equal, the current owner is viable.

If the current owner is viable and if this was the last available retry, then set the completion code for the original request to indicate that the request failed due to an obtain lock failure; set the pointer in the Switch object 60 back to the primary SwitchTransport object 62; and return to the end-user server sub-layer 54 to generate a reply to the original caller.

If the current owner is viable and if there is at least one remaining retry, then set a timer to the retry interval duration and exit to wait for the retry interval to expire.

If the current owner is moribund, then reinitialize the secondary SwitchTransport object 64, rebuild the Switch Set Lock Instruction 22 to force the lock (test field=current holder, set field=my owner ID); invoke the InitiateSend routine to send the command to the switch 14; and exit to await the interrupt when the switch 14 responds.

2. When the operation type is a read from the switch 14, the response data from the switch 14 is stored in the primary SwitchTransport object 62 and control is passed back to the end-user server sub-layer 54 for additional processing and eventual reply to the calling entity. It is noted that since read operations are never sensitive, locking is not required to protect them. For efficiency, no lock checking is done in the handling of this operation type.

3. When the operation type is a write to the switch 14, the primary SwitchTransport object 62 is checked to see if a lock was obtained while servicing this request.

If a lock was not obtained, response data from the switch 14, if any, is stored in the primary SwitchTransport object 62 and control is passed back to the end-user server sub-layer 54 for additional processing and eventual reply to the calling entity.

If a lock was obtained for this set of commands, it must be released now, before control returns to the end-user server sub-layer 54, and a ReleaseLock routine implemented in the Switch object 60 is called. At this point, no secondary SwitchTransport object 64 exists.

The ReleaseLock routine executes the following steps:

The reacquire timer is cancelled.

A new secondary SwitchTransport object 64 is created.

The new secondary SwitchTransport object 64 is chained to the primary SwitchTransport object 62.

Set the pointer in the Switch object 60 to the new secondary SwitchTransport object 64.

A Switch Set Lock Instruction 22 is built in the secondary SwitchTransport object 64 to release the lock, with the following data:

Test field=my owner ID

Set field=lock free holder ID (0x00000000)

Proof of viability field=zeros (0x00000000)

Retain interval field=zeros (0x00000000)

Send the Switch Set Lock Instruction 22 to the switch 14 via the SendCurPkt routine.

Exit to await the interrupt when the switch 14 responds.

The illustrated embodiment makes use of two interval timers, a retain (also referred to as reacquire) timer and a retry timer. The retain timer is started when a client's lock request is successful. The retry timer is started when a client's lock request is unsuccessful. Within a single lock client process 18, there can never be both a retain and a retry timer running simultaneously.

When the lock client layer 52 is awakened due to a timer request, processing depends upon what type of timer has expired.

When a retain timer expires, a ReacquireLock routine implemented in the Switch object 60 is called. In the current implementation, there will always be an active request in process when this timer expiration occurs. The commands that implement that request will be contained in the primary SwitchTransport object 62. Essentially, the processing of this interrupt will suspend the processing of the ongoing request. The ReacquireLock routine executes the following steps:

A new secondary SwitchTransport object 64 is created.

The new secondary SwitchTransport object 64 is chained to the primary SwitchTransport object 62.

Set the pointer in the Switch object 60 to the new secondary SwitchTransport object 64.

A Switch Set Lock Instruction 22 is built in the secondary SwitchTransport object 64 with:

Test field=my owner ID

Set field=my owner ID

Proof of viability field=low order 32 bits of the current time of day clock value Retain interval field=current retain interval Send the Switch Set Lock Instruction 22 to the switch 14 via the SendCurPkt routine.

Exit to await the Switch Set Lock Response 24 from the switch 14.

When the Switch Set Lock Response 24 is received, the handling determines that it was a reacquire, sets a new retain interval timer, and resumes the processing of the original request, after deleting the secondary SwitchTransport object 64.

When the expiration was a retry timer, a RetryLock routine implemented in the Switch object 60 is invoked. The secondary SwitchTransport object 64 from the original attempt to obtain the lock still exists. It will be reused for this attempt. The RetryLock routine executes the following steps:

Reinitialize status data fields in the secondary SwitchTransport object 64.

Send the Switch Set Lock Instruction 22 to the switch 14 via the SendCurPkt routine.

Exit to wait for the interrupt when the switch 14 responds.

Returning now to FIG. 4, the third and lowest layer is the switch layer 58. The switch layer 58 provides storage for lock values in the form of an array of eight sixteen byte areas. Each lock stores three data items, as described above with reference to FIG. 2. In particular, the main data items are:

Bytes 00–03=the lock holder's ID
Bytes 04–07=the lock holder's proof of viability field
Bytes 08–11=the current lock retain interval
Bytes 12–15=reserved for possible use in future implementations These data areas are initialized to all zeros (0x00000000) by the switch 14 on all resets, including initial power on reset. Note that the switch 14 stores the values in these fields as opaque data. It has no knowledge of the actual meaning of the data, e.g. the switch 14 is not aware that bytes 00–03 represent the identification of the lock owner.

In one implementation, the Switch Set Lock Instruction 22 is conveyed in the data payload of an IBC packet. The firmware running in the switch 14 recognizes the Switch Set Lock Instruction 22 by the presence of the hexadecimal value 0x1E in the first byte (i.e., byte 0) of the IBC packet header. The next two bytes of the IBC packet header (i.e., bytes 1 and 2) are interpreted as an index into the above noted storage array and are used to indicate which lock is being selected for operations by this command.

When the switch 14 receives a valid Switch Set Lock Instruction 22, the following steps are executed:

The target lock is determined from bytes 1 and 2 of the IBC packet header.

The first four bytes of the Switch Set Lock Instruction 22 (the test value) are extracted and compared to the current value in the first four bytes of the target lock.

When the comparison is equal:
Bytes 04–07 are extracted from the command data and stored in the target lock at bytes 00–03.
Bytes 08–11 are extracted from the command data and stored in the target lock at bytes 04–07.
Bytes 12–15 are extracted from the command data and stored in the target lock at bytes 08–11.
Control is passed to the command response functionality.

When the comparison is not equal:
No changes are made in the data stored in the target lock.
Control is passed to the command response functionality.

The command response is generated by storing the entire sixteen bytes of data from the target lock in the data portion of a Switch Set Lock Response packet 24. The Switch Set Lock Response 24 is then sent to the lock client process 18 that originally sent the Switch Set Lock Instruction 22 to the switch 14.

Figure 10A:
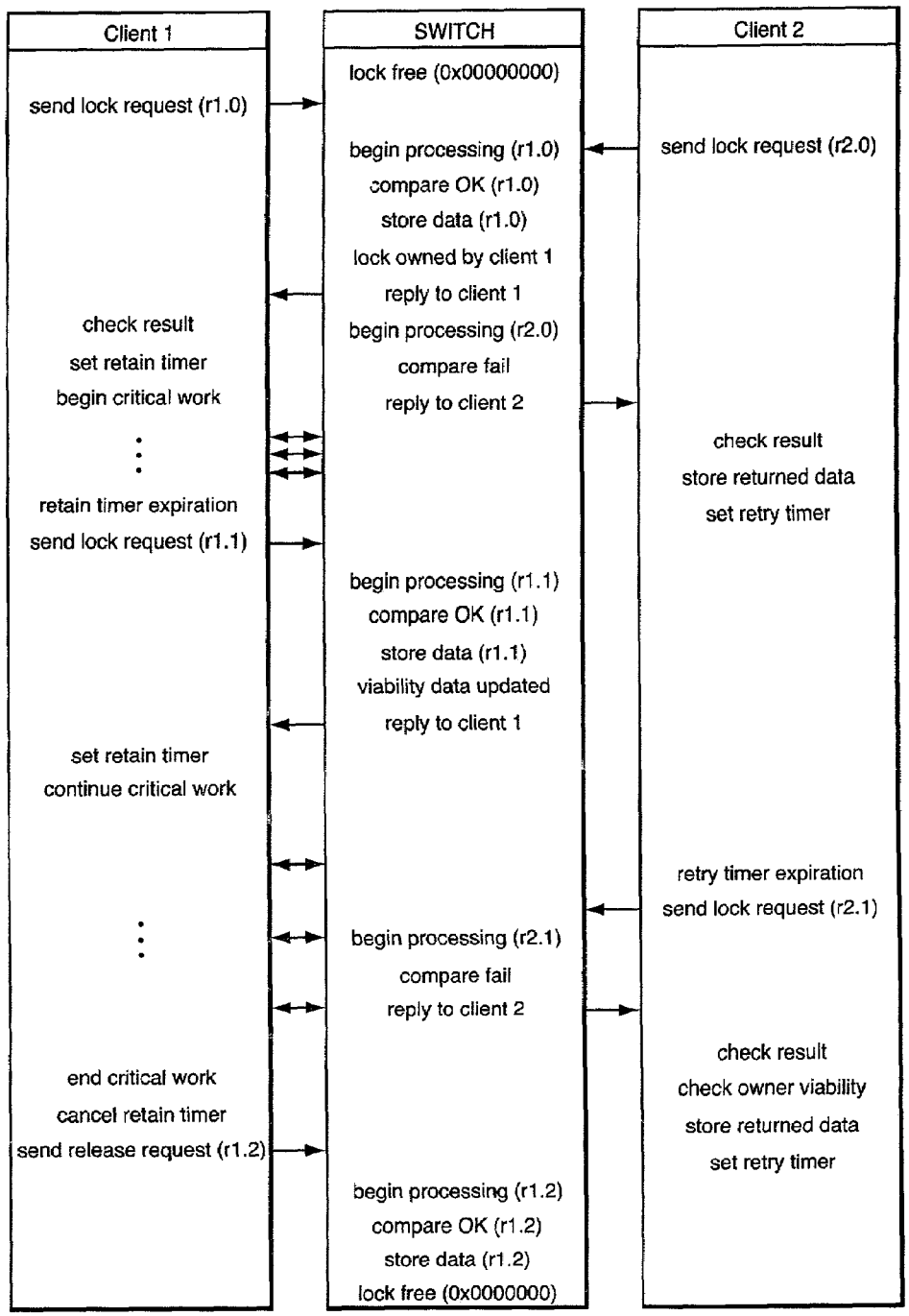
FIGS. 10A and 10B is a simplified timeline illustrating the operation of the locking protocol of the system of FIG. 1.
Figure 10B:
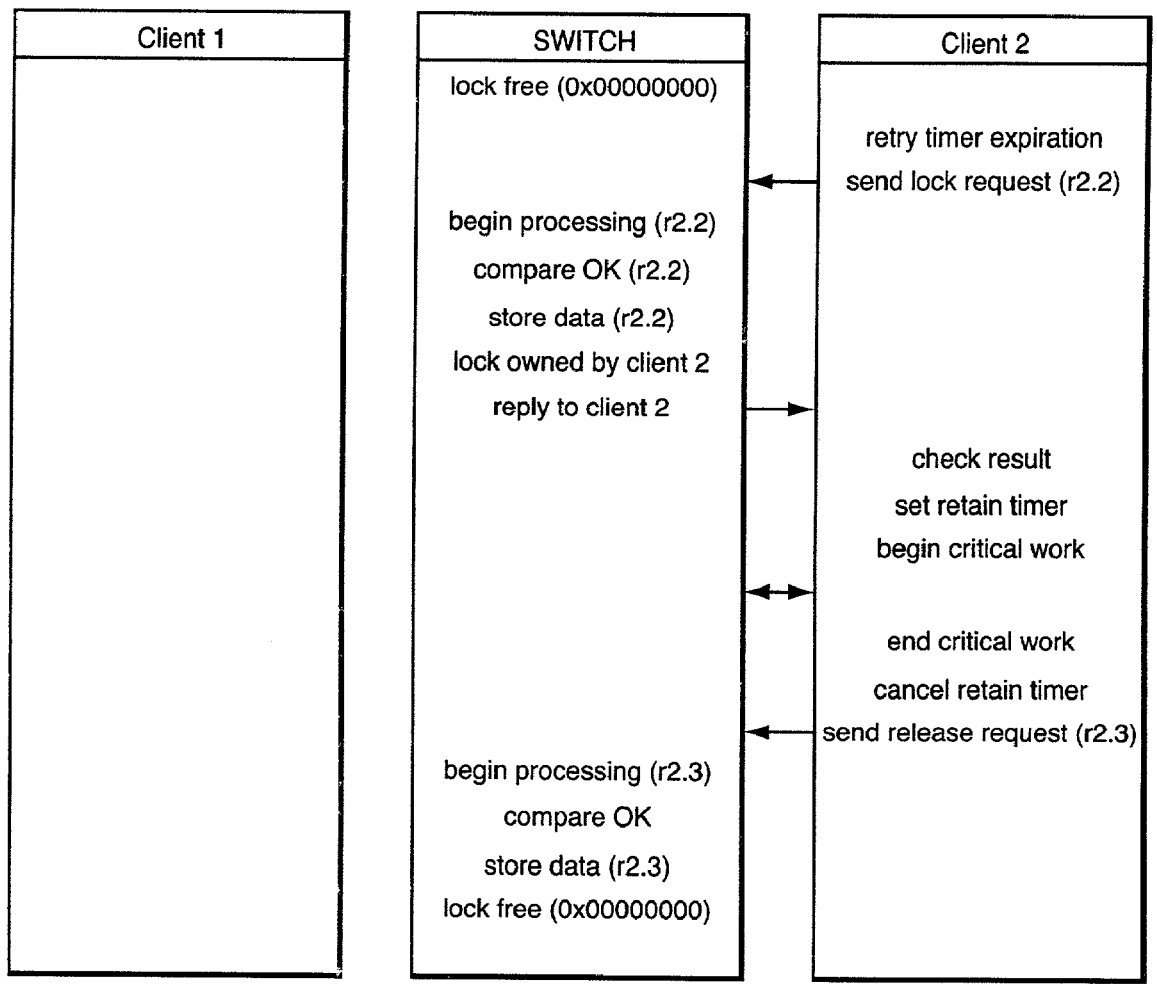

FIGS. 10A and 10B show an exemplary timeline illustrating the exchange between two lock client processes 18 competing to run sensitive commands on a switch 14. As can be seen from these figures, client 1 acquires the lock, sets the retain timer and begins the critical/sensitive work on the switch 14. Before the work is complete, the retain timer expires. Client 1 reacquires the lock and continues the critical work. At the end of the critical work, client 1 releases the lock and cancels the retain timer. Client 2, on the other hand, attempts to obtain the lock after it has been obtained by client 1. Client 2 then sets a retry timer, and when it expires, attempts to obtain the lock for a second time. In the mean time however, client 1 has reacquired the lock and client 2 again fails to acquire the lock. A second retry timer is set, and when this expires, the third attempt by client 2 to obtain the lock succeeds. Client 2 begins critical work on the switch and sets a retain timer. When the critical work executed by client 2 is completed (before expiry of the retain timer), client 2 releases the lock and cancels the retain timer.

From the switch's perspective, the initial Switch Set Lock Instruction 22 from client 1 is compared with the data in the lock stored in the switch, and, upon a successful compare, the data in the lock is updated and returned to client 1. When the Switch Set Lock Instruction 22 from client 2 is received, the comparison between the data in this command and the lock data fails, the switch 14 does not update the lock data, and the current lock data is returned to client 2. The switch 14 then receives and begins processing the sensitive commands from client 1. While processing the sensitive commands, the switch 14 receives a second Switch Set Lock Instruction 22 from client 1, which client 1 has sent as a result of the expiry of the retain timer set by client 1. The comparison between this command and the lock data succeeds, and the lock data is updated, in particular with new data in the viability field to indicate that client 1 is not moribund. The switch 14 then receives and processes further sensitive commands from client 1. While these are being processed, a second Switch Set Lock Instruction 22 from client 2 is received, the comparison between the data in this command and the lock data fails, the switch 14 again does not update the lock data, and the current lock data is returned to client 2. The switch 14 then receives and continues processing further sensitive commands from client 1, until it receives a Switch Set Lock Instruction 22 from client 1 that releases the lock (i.e. sets the data fields to zero). The switch 14 then receives a further Switch Set Lock Instruction 22 from client 2, which is compared with the data in the lock, and, upon a successful compare, the data in the lock is updated and returned to client 2. The switch 14 then receives and begins processing the sensitive commands from client 2. After completing the sensitive commands from client 2, it receives a Switch Set Lock Instruction 22 from client 2 that releases the lock (i.e. sets the data fields to zero).

CONCLUSION

In sum, variations to the embodiments described herein would be apparent to those of ordinary skill in the art. Accordingly it is intended that those variations would be within the scope and spirit of the present invention. It is also intended that the description be considered as encompassing equivalents thereof.

We claim:

1. A networked computing system comprising:
   A) a network resource that is to be maintained;
   B) a lock data area indicating an ownership status of the network resource;
   C) a lock server process for maintaining the lock data area;
   D) a plurality of clients that are to perform maintenance on the network resource, a client being operative to:
      i) send a command to the lock server process to modify the lock data area to indicate ownership of the network resource by the client;
      ii) receive a response from the lock server process indicating whether or not ownership of the network resource by the client is indicated by the lock data area;
      iii) perform maintenance on the network resource only if ownership of the network resource is indicated by the lock data area;
      iv) if the response indicates that ownership of the network resource by the client is not indicated by the lock data area, the client is operative to:
         a) set a retry interval timer; and
         b) upon expiry of the retry interval timer, send a further command to the lock server process to modify the lock data area to indicate ownership of the network resource by the client; and
      v) after at least two unsuccessful attempts to modify the lock data area to indicate ownership of the network resource by the client, the client is operative to:
         a) determine, from lock owner viability data received from the lock server process, whether or not a current lock owner is viable; and
         b) if the current lock owner is not viable, send a command that is configured to establish the client as the lock owner notwithstanding that the client is not the current lock owner.

2. The system of claim 1 wherein the step of determining lock owner viability performed by the client comprises:
   comparing lock owner data and lock viability data received in two consecutive responses from the lock server process.

3. The system of claim 2 wherein the client is operative to consider the current lock owner viable if the lock owner data or lock viability data received in two consecutive responses from the lock server process differ, and to otherwise consider the current lock owner non-viable.

4. The system of claim 1 wherein the command includes client viability data, the client being operative to, upon successfully modifying the lock data area to indicate ownership of the network resource by the client:
   i) set a reacquire interval timer; and
   ii) send updated client viability data to the lock server process if maintenance being performed by the client has not been completed when the reacquire interval timer expires.

5. The system of claim 1 wherein each of the plurality of clients has a unique and non-null lock owner ID.

6. The system of claim 1 wherein the lock data area includes lock owner data, lock viability data, and retain interval data, and the command to the lock server process to modify the lock data area includes a set value, a test value, a viability value, and a retain interval value.

7. The system of claim 6 wherein the lock data area contains null data values when the network resource is not owned by any client.

8. The system of claim 6 wherein the lock server process is operative to:
   compare the test value in the command with a lock owner value in the lock data area; and
   write the set value into the lock owner value if said comparison shows that the test value is equal to the lock owner value.

9. The system of claim 8 wherein the lock server process is operative to send a response to the client after conducting any updates in the lock data area.

10. The system of claim 9 wherein the response includes lock owner data, lock viability data, and retain interval data stored in the network resource.

11. The system of claim 8 wherein the client constructs the command with a set value equal to the client's lock owner ID and a null test value, unless the client has determined that the current lock owner is no longer viable.

12. The system of claim 8 wherein the client is operative to force the lock data area to indicate ownership of the network resource, the network resource nominally being owned by a second client, by sending a command that includes a test value equal to an identity of the second client and a set value equal to an identity of the forcing client.

13. A client process for maintaining a network resource, authorization to maintain the network resource being indicated by the contents of a lock data area stored on the network resource, the client process being configured to:
   send a first request to modify the lock data area to indicate that the client process is authorized to maintain the network resource;
   receive a first response indicating whether or not the client process has successfully modified the lock data area to indicate that the client process is authorized to maintain the network resource; and
   send maintenance commands to the network resource only if the first response indicates successful modification of the lock data area;
   wherein the client process is further configured to:
   set a first retry interval timer if the first response indicates that the client process has not successfully modified the lock data area to indicate that the client process is authorized to maintain the network resource;
   after the first retry interval timer expires, send a second request to modify the lock data area to indicate that the client process is authorized to maintain the network resource;
   receive a second response indicating whether or not the client process has successfully modified the lock data area to indicate that the client process is authorized to maintain the network resource; and
   send maintenance commands to the network resource only if the second response indicates successful modification of the lock data area;
   wherein the first response includes first viability data and the second response includes second viability data, the client process being configured to:
   compare the first viability data with the second viability data;
   based on the comparison, either set a second retry interval timer or send a third request to modify the lock data area, the third request being configured to ensure that the lock data area will be modified to indicate that the client process is authorized to maintain the network resource;
   receive a third response indicating whether or not the client process has successfully modified the lock data area to indicate that the client process is authorized to maintain the network resource; and send maintenance commands to the network resource only if the third response indicates successful modification of the lock data area.

14. The client process of claim 13 wherein the duration of the retry interval timer is at least twice the duration of retain interval data returned in a response sent by the lock server process.

15. The client process of claim 13 wherein the client process is further operative to:

abort the intended transmission of maintenance commands to the network resource with an appropriate error indication if the first, second, and third responses indicate that the client process has not successfully modified the lock data area to indicate that the client process is authorized to maintain the network resource.

16. The client process of claim 13 wherein the client process is further operative to:

set a reacquire interval timer if the client process receives a response indicating successful modification of the lock data area to indicate that the client process is authorized to maintain the network resource;

provide viability data to be stored in the lock data area;

on every expiry of the reacquire interval timer, restart the reacquire interval timer and send a request to modify the lock data area with new viability data to indicate that the client process continues to viably hold the network resource, and upon completion of the maintenance commands by the network resource, cancel the reacquire interval timer and send a new request to modify the lock data area with null values to indicate that the network resource is no longer owned by any client process.

* * * * *